United States Patent
Komori et al.

(10) Patent No.: US 9,842,671 B2
(45) Date of Patent: Dec. 12, 2017

(54) SEAL MEMBER AND SEAL STRUCTURE FOR MULTICORE CABLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hirokazu Komori, Mie (JP); Hiroki Hirai, Mie (JP); Tomoyuki Sakata, Mie (JP); Makoto Higashikozono, Mie (JP); Masato Tsutsuki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/316,300

(22) PCT Filed: Jun. 23, 2015

(86) PCT No.: PCT/JP2015/067969
§ 371 (c)(1),
(2) Date: Dec. 5, 2016

(87) PCT Pub. No.: WO2015/199055
PCT Pub. Date: Dec. 30, 2015

(65) Prior Publication Data
US 2017/0162299 A1 Jun. 8, 2017

(30) Foreign Application Priority Data
Jun. 26, 2014 (JP) ................. 2014-131700

(51) Int. Cl.
*H01B 7/28* (2006.01)
*H01B 7/18* (2006.01)

(52) U.S. Cl.
CPC ............. *H01B 7/28* (2013.01); *H01B 7/1805* (2013.01)

(58) Field of Classification Search
CPC ......... H01B 7/28; H01B 7/1805; H02G 15/03
See application file for complete search history.

(56) References Cited

U.S. PATENT DOCUMENTS 5,720,487 A 2/1998 Kato
6,150,607 A * 11/2000 Weyl .................... H01B 17/308
16/2.1

(Continued)

FOREIGN PATENT DOCUMENTS

EP 1791222 5/2007
EP 2587594 5/2013

(Continued)

OTHER PUBLICATIONS

Search Report issued in International Bureau of WIPO Patent Application No. PCT/JP2015/067969, dated Sep. 29, 2015.

(Continued)

*Primary Examiner* — Hoa C Nguyen
*Assistant Examiner* — Amol Patel
(74) *Attorney, Agent, or Firm* — Greenblum & Bernstein, P.L.C.

(57) ABSTRACT

A seal structure for multicore cable includes a multicore cable configured such that a plurality of first to fourth wires are surrounded by a sheath and drawn out from an end part of the sheath, and a rubber plug including a sheath fitting portion to be externally fitted to the end part of the sheath and a wire penetrating portion having a plurality of first to fourth through holes, through which the plurality of first to fourth wires drawn out from the end part of the sheath are respectively passed. Sheath side lips to be held in contact with an outer periphery of the sheath are provided on an inner periphery of the sheath fitting portion. First to fourth wire side lips to be respectively held in close contact with outer peripheries of the plurality of first to fourth wires are provided on inner peripheries of the plurality of first to fourth through holes.

8 Claims, 19 Drawing Sheets

(56) References Cited

U.S. PATENT DOCUMENTS

| | | | |
|---|---|---|---|
| 6,485,333 B1 | 11/2002 | Shinchi | |
| 2011/0021076 A1 | 1/2011 | Sawada | |
| 2013/0075133 A1* | 3/2013 | Meilhamer | ............. G01D 1/00 |
| | | | 174/152 G |
| 2013/0105219 A1* | 5/2013 | Osawa | ............... H01R 13/5208 |
| | | | 174/77 R |

FOREIGN PATENT DOCUMENTS

| | | |
|---|---|---|
| JP | 04-023812 | 2/1992 |
| JP | 2003-174716 | 6/2003 |
| JP | 2013-097898 | 5/2013 |

OTHER PUBLICATIONS

Search Report issued in European Patent Office (EPO) Patent Application No. 15812420.6, dated Apr. 24, 2017.

\* cited by examiner

SEAL MEMBER AND SEAL STRUCTURE FOR MULTICORE CABLE

TECHNICAL FIELD

The present invention relates to a seal member and a seal structure for multicore cable.

BACKGROUND ART

Conventionally, a waterproof structure for an end part of a multicore sheathed cable is known from Japanese Unexamined Patent Publication No. 2003-174716 (patent literature 1). This waterproof structure is such that a tubular body is mounted on the tip of a sheath of the multicore sheathed cable from which a plurality of wires are pulled out, and a sealing material such as silicon-based adhesive is filled into the interior of this tubular body.

In the above multicore sheathed cable, the tip of a nozzle is first inserted into a clearance between the sheath and the tubular body and, after a sealing agent is injected from the tip of the nozzle, the tip of the nozzle is inserted between a plurality of wires and the sealing material is injected between each of the plurality of wires. In this way, sealing is provided between the wires and the sheath and between each of the plurality of wires.

CITATION LIST

Patent Literature

Patent Literature 1:
Japanese Unexamined Patent Publication No. 2003-174716

SUMMARY OF THE INVENTION

Technical Problem

However, according to the above configuration, the nozzle is inserted between each of the plurality of wires and the sealing material is filled in each clearance. Thus, a considerable time is required to fill the adhesive into the tubular body. Further, a time for curing the sealing material is also necessary. Thus, there has been a problem of reducing operation efficiency.

The present invention is directed to a seal structure for multicore cable with a multicore cable configured such that a plurality of wires are surrounded by a sheath and drawn out from an end part of the sheath, and a rubber plug including a sheath fitting portion to be externally fitted to the end part of the sheath and a wire penetrating portion having a plurality of through holes, through which the plurality of wires drawn out from the end part of the sheath are respectively passed, wherein a sheath side lip to be held in contact with an outer periphery of the sheath is provided on an inner periphery of the sheath fitting portion, and a wire side lip to be held in close contact with an outer periphery of each of the plurality of wires is provided on an inner periphery of each of the plurality of through holes.

Further, the present invention is directed to a seal member to be mounted on a multicore cable configured such that a plurality of wires are surrounded by a sheath and drawn out from an end part of the sheath, the seal member including a rubber plug including a sheath fitting portion to be externally fitted to the end part of the sheath and a wire penetrating portion having a plurality of through holes, through which the plurality of wires drawn out from the end part of the sheath are respectively passed, wherein a sheath side lip to be held in contact with an outer periphery of the sheath is provided on an inner periphery of the sheath fitting portion, and a wire side lip to be held in close contact with an outer periphery of each of the plurality of wires is provided on an inner periphery of each of the plurality of through holes.

According to the present invention, sealing is provided between the sheath and the rubber plug by the sheath side lip provided in the rubber plug. Further, sealing is provided between each wire and the rubber plug by the wire side lip formed in each through hole through which each wire is passed. As just described, according to the present invention, it is possible to seal between the sheath and the rubber plug and between each of the plurality of wires branched from the multicore cable by mounting the rubber plug on the end part of the sheath of the multicore cable. As a result, operation efficiency for suppressing the intrusion of liquid into the interior of the sheath from the end part of the sheath and from branched parts of the plurality of wires can be improved in the multicore cable.

The following aspects are preferable as embodiments of the present invention.

A cap is externally fitted to the rubber plug, and the cap includes a sheath side pressing portion for bringing the outer periphery of the sheath and the sheath side lip into close contact for sealing by pressing the sheath fitting portion of the rubber plug from outside, and a wire side pressing portion for bringing the outer periphery of each of the plurality of wires and the wire side lip formed in each of the plurality of through holes into close contact for sealing by pressing the wire penetrating portion from outside.

According to the above aspect, sealing is reliably provided between the sheath and the rubber plug and between each wire and each through hole. In this way, the intrusion of liquid into the interior of the sheath from the end part of the sheath and from the branched parts of the plurality of wires can be reliably suppressed.

The rubber plug is formed with a holding portion for holding a guide member including a plurality of guide holes, through which the plurality of wires drawn out from the end part of the sheath are respectively passed, at a position between the sheath fitting portion and the wire penetrating portion, and each of the plurality of guide holes and each of the plurality of through holes correspond with the guide member held in the holding portion.

According to the above aspect, each of the plurality of wires can be reliably passed through each of the plurality of through holes provided in the rubber plug. This enables the outer periphery of each wire and the wire side lip of each through hole to be reliably held in close contact. As a result, the intrusion of liquid into the interior of the sheath from the branched parts of the plurality of wires can be reliably suppressed.

The plurality of wires include two or more types of wires having different outer diameters, and each of the plurality of through holes of the rubber plug has an inner diameter corresponding to the outer diameter of each of the plurality of wires.

According to the above aspect, sealing can be reliably provided between each of the plurality of wires even if the plurality of wires have different diameters.

Effect of the Invention

According to the present invention, the efficiency of an operation of sealing branched parts of a plurality of wires drawn out from a multicore cable can be improved.

EMBODIMENT OF THE INVENTION

Embodiment

An embodiment in which the present invention is applied to a seal structure 12 for a multicore cable 11 is described with reference to FIGS. 1 to 19. This embodiment can be, for example, used in a wiring harness for electric parking brake mounted in a vehicle (not shown).

(Multicore Cable 11)

As shown in FIGS. 1 to 4, the multicore cable 11 according to this embodiment is configured such that a plurality of wires 13A, 13B, 13C and 13D (four in this embodiment) are surrounded by a sheath 14 made of insulating synthetic resin. The wires 13A, 13B, 13C and 13D are each configured such that the outer periphery of a core made of metal (not shown) is covered by an insulation coating (not shown) made of synthetic resin. The multicore cable 11 has a circular cross-sectional shape.

Figure 6:
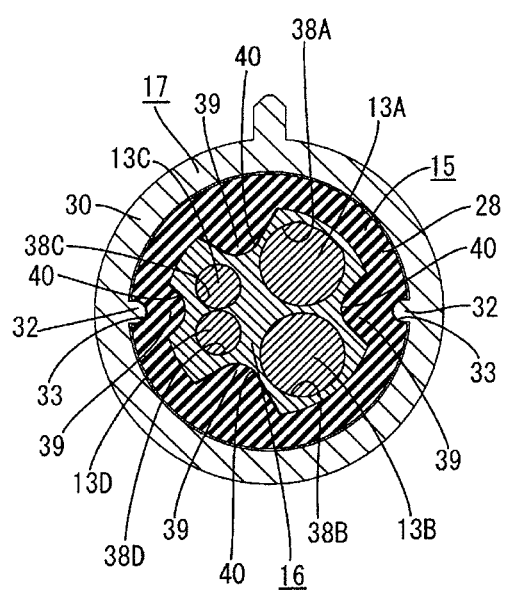
FIG. 6 is a section along VI-VI of FIG. 2.
Figure 7:
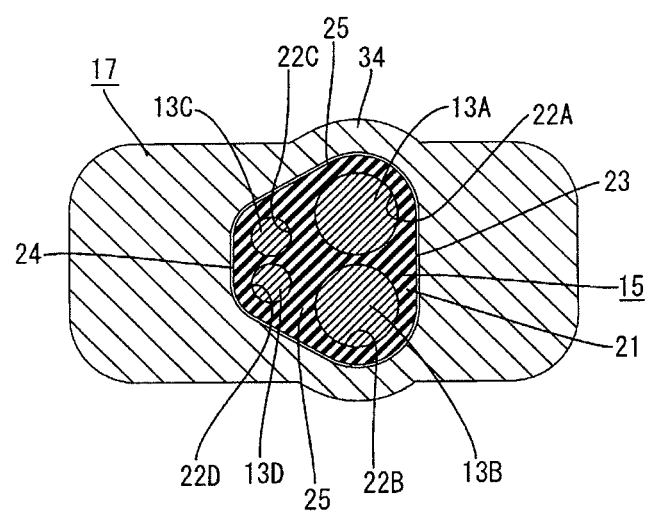
FIG. 7 is a section along VII-VII of FIG. 2.

As shown in FIGS. 6 and 7, the four wires 13A, 13B, 13C and 13D include two types of wires 13A, 13B, 13C and 13D having different outer diameters. In this embodiment, the first and second wires 13A, 13B connected to a motor for electric parking brake and the third and fourth wires 13C, 13D for a sensor of an anti-lock brake system are included. The first, second, third and fourth wires 13A, 13B, 13C and 13D have a circular cross-sectional shape.

Outer diameters of the first and second wires 13A, 13B are set to be larger than those of the third and fourth wires 13C, 13D. The outer diameter of the first wire 13A and that of the second wire 13B are set to be equal. Further, the outer diameter of the third wire 13C and that of the fourth wire 13D are set to be equal. The first, second, third and fourth wires 13A, 13B, 13C and 13D are drawn out from an end part 14A of the sheath 14 of the multicore cable 11 and respectively branched.

(Seal Member 10)

As shown in FIGS. 1 to 4, the seal member 10 is mounted in an area of the end part 14A of the sheath 14 of the multicore cable 11 where the first, second, third and fourth wires 13A, 13B, 13C and 13D are branched. The intrusion of liquid such as water or oil into the interior of the sheath 14 from the end part 14A of the sheath 14 is suppressed by the seal member 10. The seal member 10 includes a rubber plug 15 to be externally fitted to the end part 14A of the sheath 14, a guide member 16 to be mounted in the rubber plug 15 and a cap 17 to be externally fitted to the rubber plug 15.

(Rubber Plug 15)

Figure 1:
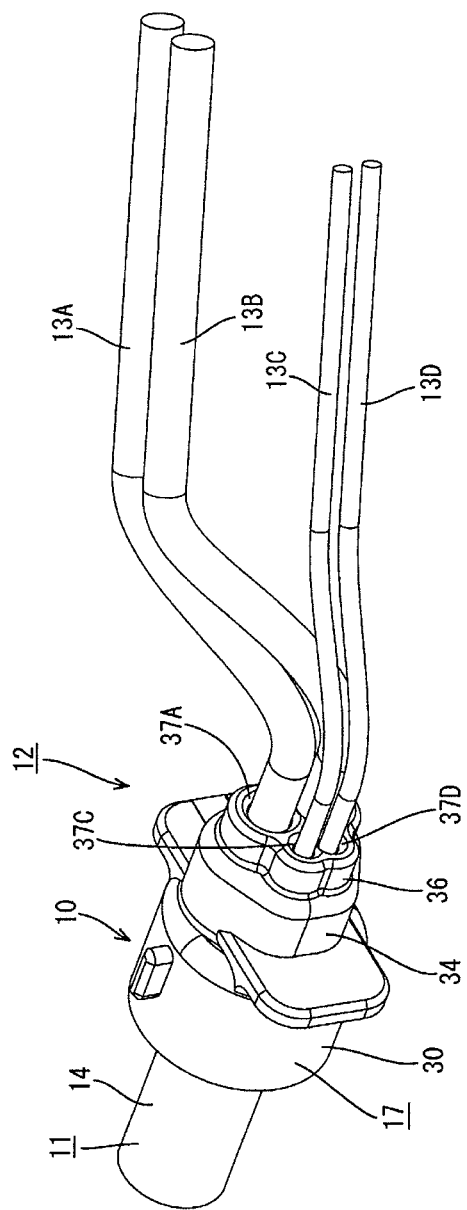
FIG. 1 is a perspective view showing a seal structure for multicore cable according to a first embodiment.
Figure 2:
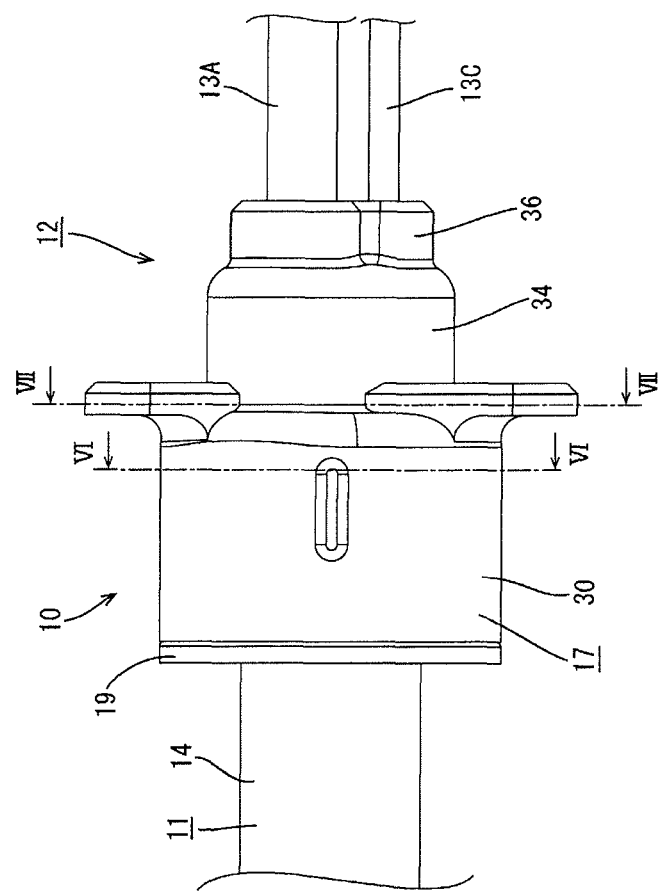
FIG. 2 is a plan view showing the seal structure for multicore cable.
Figure 3:
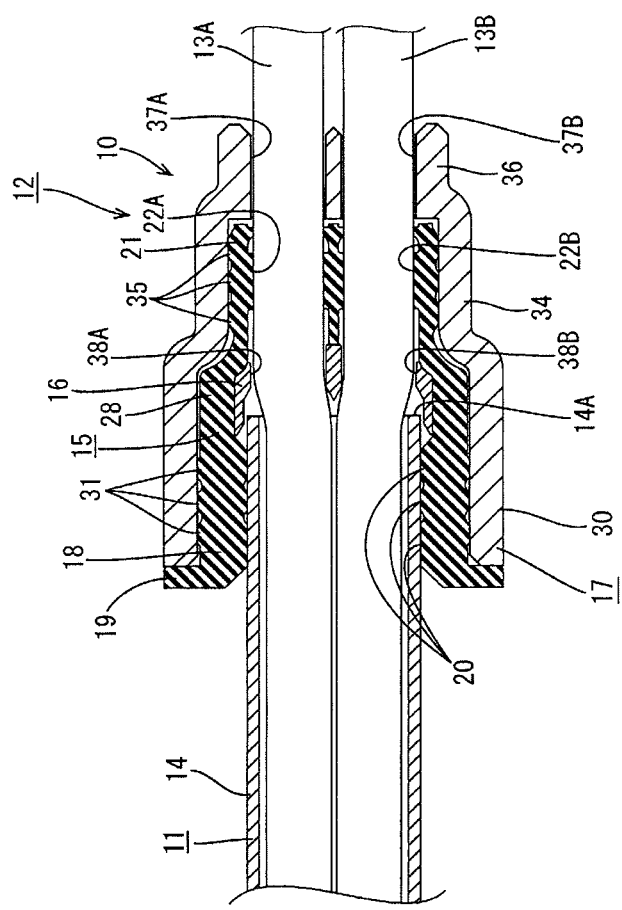
FIG. 3 is a section along III-III of FIG. 5.
Figure 4:
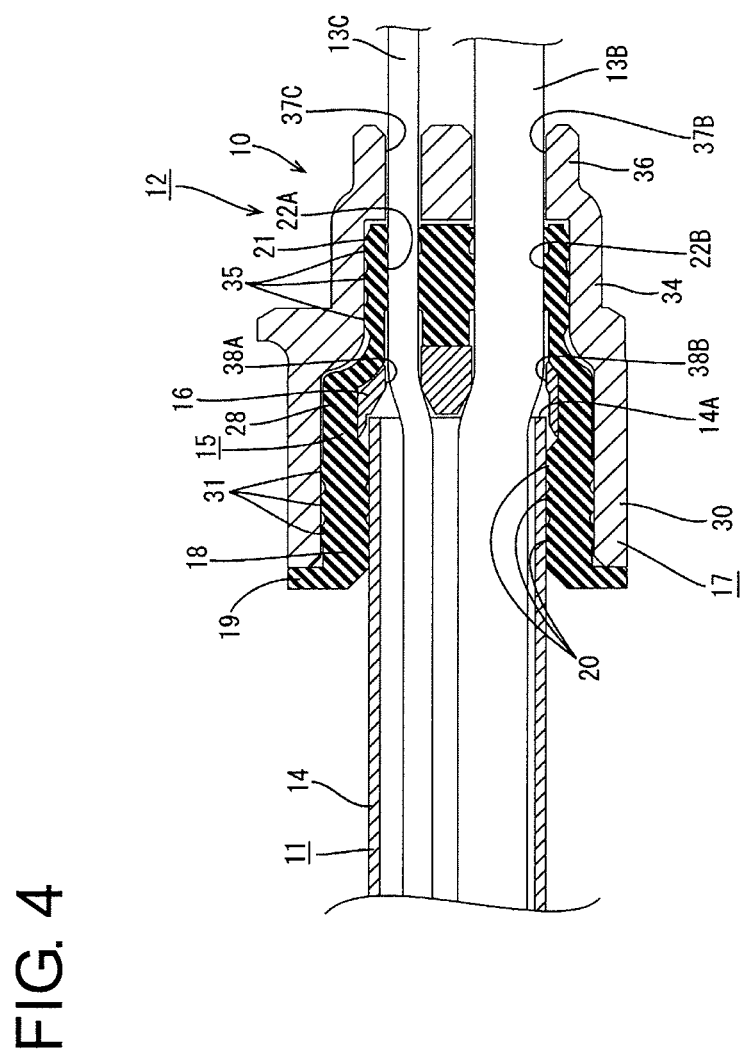
FIG. 4 is a section along IV-IV of FIG. 5.
Figure 5:
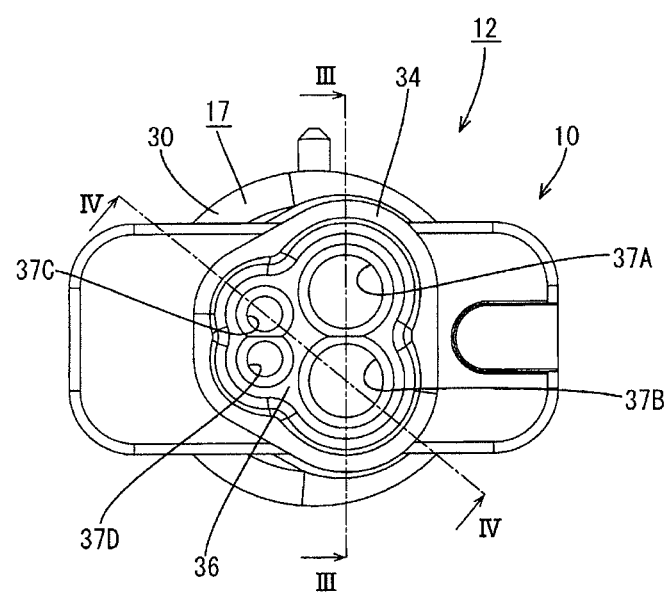
FIG. 5 is a front view showing a seal member.

As shown in FIGS. 3 and 4, the rubber plug 15 is externally fitted to the end part 14A of the sheath 14. The rubber plug 15 includes a sheath fitting portion 18 to be externally fitted to the end part 14A of the sheath 14. The sheath fitting portion 18 is in the form of a receptacle extending toward a side (left side in FIG. 3) opposite to the end part 14A of the sheath 14 and open in a direction (leftward in FIG. 3) opposite to the end part 14A of the sheath 14. A flange portion 19 projecting radially outwardly of the sheath fitting portion 18 is formed on an end edge part of the sheath fitting portion 18. The sheath fitting portion 18 is formed into a substantially cylindrical shape in a natural state.

(Sheath-Side Lips 20)

Figure 8:
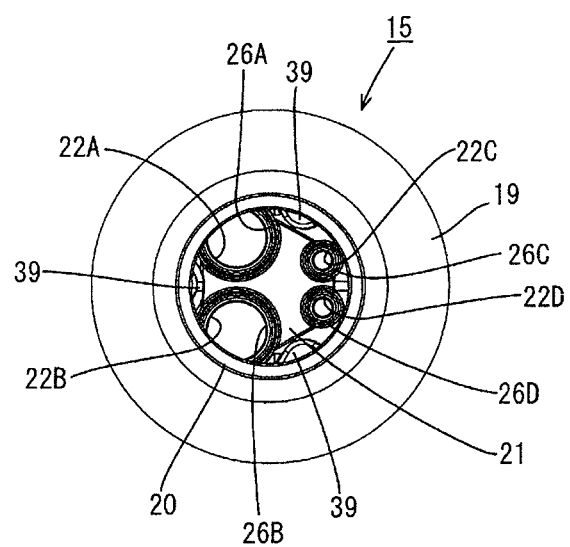
FIG. 8 is a rear view showing a rubber plug.

As shown in FIGS. 3, 4 and 8, a plurality of annular sheath side lips 20 projecting inwardly are formed in a circumferential direction of the sheath fitting portion on the inner periphery of the sheath fitting portion 18. With the sheath fitting portion 18 externally fitted to the end part 14A of the sheath 14, the sheath side lips 20 are held in close contact with the outer periphery of the sheath 14. In this way, sealing is provided between the rubber plug 15 and the sheath 14.

(Wire Penetrating Portion 21)

Figure 9:
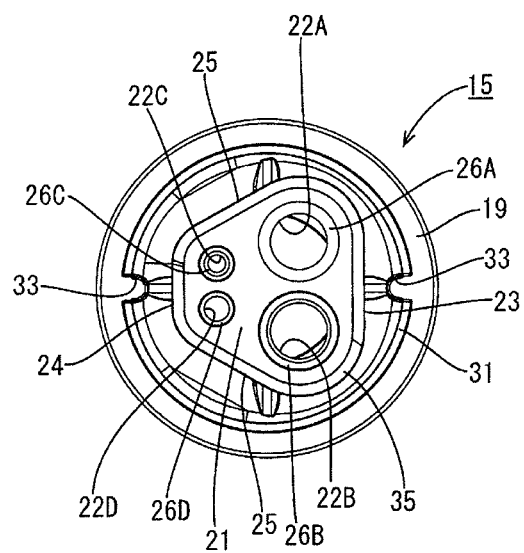
FIG. 9 is a front view showing the rubber plug.

As shown in FIGS. 3, 4 and 9, the rubber plug 15 is provided with a wire penetrating portion 21 including a plurality of (four in this embodiment) through holes 22A, 22B, 22C and 22D, through which the first, second, third and fourth wires 13A, 13B, 13C and 13D are respectively passed, on an end part opposite to the sheath fitting portion 18. The plurality of through holes 22A, 22B, 22C and 22D include the first through hole 22A through which the first wire 13A is passed, the second through hole 22B through which the second wire 13B is passed, the third through hole 22C through which the third wire 13C is passed and the fourth through hole 22D through which the fourth wire 13D is passed.

As shown in FIG. 9, a cross-sectional shape of the wire penetrating portion 21 is a trapezoidal shape with rounded corners. The cross-sectional shape of the wire penetrating portion 21 has a long side 23, a short side 24 parallel to this long side 23 and shorter than the long side 23 and two oblique sides 25 coupling end parts of the long side 23 and those of the short side 24.

The wire penetrating portion 21 is formed with the first and second through holes 22A, 22B arranged side by side along an extending direction of the long side 23 (vertical direction in FIG. 9) at positions near the long side 23. Further, the wire penetrating portion 21 is formed with the third and fourth through holes 22C, 22D arranged side by side along an extending direction of the short side 24 (vertical direction in FIG. 9) at positions near the short side 24.

Figure 10:
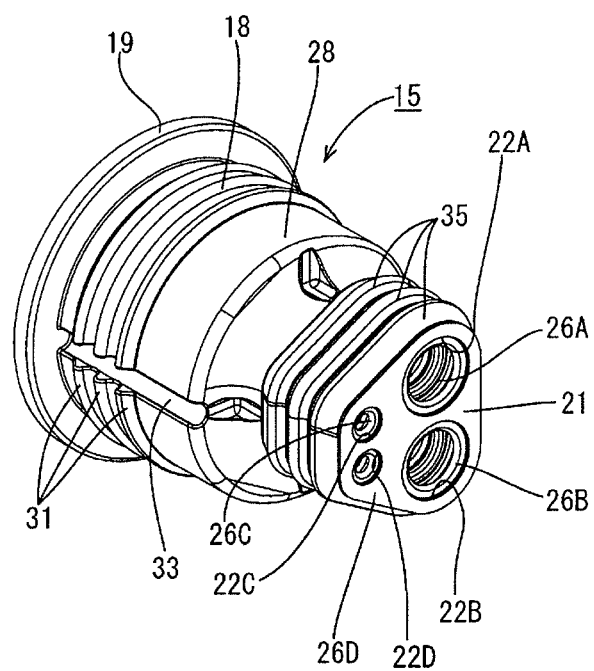
FIG. 10 is a perspective view showing the rubber plug.

An inner diameter of the first through hole 22A is slightly larger than the outer diameter of the first wire 13A. As shown in FIGS. 9 and 10, annular first wire side lips 26A (an example of wire side lips) to be held in close contact with the outer periphery of the first wire 13A are formed along a circumferential direction of the first through hole 22A on the inner periphery of the first through hole 22A. The first wire side lips 26A are held in close contact with the outer periphery of the first wire 13A with the first wire 13A passed through the first through hole 22A. In this way, sealing is provided between the first wire 13A and the rubber plug 15.

An inner diameter of the second through hole 22B is slightly larger than the outer diameter of the second wire 13B. As shown in FIGS. 9 and 10, annular second wire side lips 26B (an example of the wire side lips) to be held in close contact with the outer periphery of the second wire 13B are formed along a circumferential direction of the second through hole 22B on the inner periphery of the second through hole 22B. The second wire side lips 26B are held in close contact with the outer periphery of the second wire 13B with the second wire 13B passed through the second through hole 22B. In this way, sealing is provided between the second wire 13B and the rubber plug 15.

An inner diameter of the third through hole 22C is slightly larger than the outer diameter of the third wire 13C. As shown in FIGS. 9 and 10, annular third wire side lips 26C (an example of the wire side lips) to be held in close contact with the outer periphery of the third wire 13C are formed along a circumferential direction of the third through hole 22C on the inner periphery of the third through hole 22C. The third wire side lips 26C are held in close contact with the outer periphery of the third wire 13C with the third wire 13C passed through the third through hole 22C. In this way, sealing is provided between the third wire 13C and the rubber plug 15.

An inner diameter of the fourth through hole 22D is slightly larger than the outer diameter of the fourth wire 13D. As shown in FIGS. 9 and 10, annular fourth wire side lips 26D (an example of the wire side lips) to be held in close contact with the outer periphery of the fourth wire 13D are formed along a circumferential direction of the fourth through hole 22D on the inner periphery of the fourth through hole 22D. The fourth wire side lips 26D are held in close contact with the outer periphery of the fourth wire 13D with the fourth wire 13D passed through the fourth through hole 22D. In this way, sealing is provided between the fourth wire 13D and the rubber plug 15.

As shown in FIGS. 3 and 4, the rubber plug 15 is formed with a holding portion 28 for holding the guide member 16 including a plurality of (four in this embodiment) guide holes 38A, 38B, 38C and 38D, through which the first, second, third and fourth wires 13A, 13B, 13C and 13D are passed, at a position between the sheath side lips 20 and the wire penetrating portion 21 in the sheath fitting portion 18.

(Cap 17)

As shown in FIGS. 3 and 4, the cap 17 made of synthetic resin is externally fitted to the rubber plug 15. The cap 17 is externally fitted to the rubber plug 15 from a side toward which the first, second, third and fourth wires 13A, 13B, 13C and 13D are drawn out from the end part 14A of the sheath 14 (right side in FIG. 3). The cap 17 is open from the side, toward which the first, second, third and fourth wires 13A, 13B, 13C and 13D are drawn out, toward the sheath 14 (leftward in FIG. 3). An opening end edge of the cap 17 is in contact with the flange portion 19 of the rubber plug 15.

Figure 11:
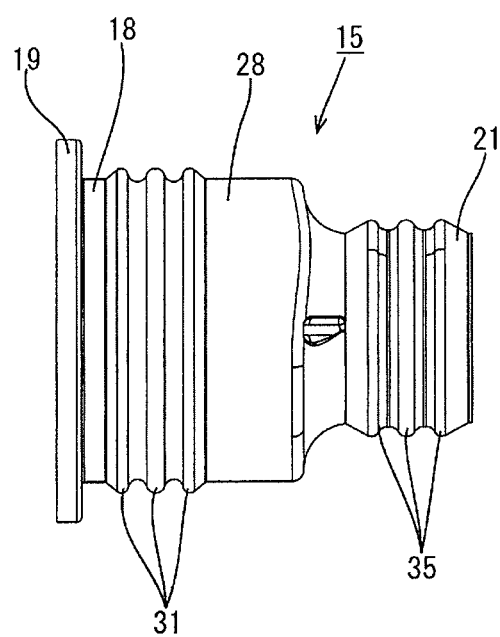
FIG. 11 is a plan view showing the rubber plug.
Figure 12:
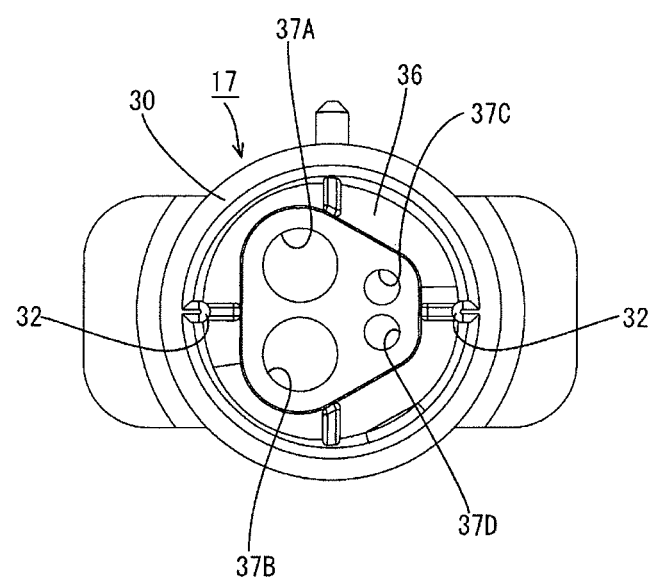
FIG. 12 is a rear view showing a cap.

The cap 17 is formed with a large diameter portion 30 (an example of a sheath side pressing portion) to be externally fitted to the sheath fitting portion 18 of the rubber plug 15 at a position on an opening end edge side (left side in FIG. 3) of the cap 17. As shown in FIG. 12, the large diameter portion 30 is formed to have a circular cross-sectional shape in conformity with the outer shape of the sheath fitting portion 18. The inner periphery of the large diameter portion 30 is held in contact with a plurality of (three in this embodiment) large-diameter-portion side lips 31 formed on the outer periphery of the sheath fitting portion 18. As shown in FIGS. 10 and 11, the large-diameter-portion side lips 31 project outwardly on the outer peripheral surface of the sheath fitting portion 18 and are formed along a circumferential direction of the sheath fitting portion 18. Sealing is provided between the large diameter portion 30 of the cap 17 and the sheath fitting portion 18 of the rubber plug 15 by the close contact of the large-diameter-portion side lips 31 and the inner periphery of the large diameter portion 30 of the cap 17.

As shown in FIGS. 6 and 12, a plurality of (two in this embodiment) rib-like rubber plug locking portions 32 extending in an opening direction of the cap 17 are formed in the large diameter portion 30 of the cap 17. The two rubber plug locking portions 32 are formed at positions facing each other on the inner periphery of the large diameter portion 30.

As shown in FIGS. 6 and 10, two rubber plug locked portions 33 into which the plurality of (two in this embodiment) rubber plug locking portions 32 are to be fitted are formed into grooves along an extending direction of the sheath fitting portion 18 by recessing the outer peripheries of the sheath fitting portion 18 and the holding portion 28 of the rubber plug 15. The two rubber plug locked portions 33 are respectively formed at positions corresponding to the two rubber plug locking portions 32 formed in the large diameter portion 30.

The rubber plug locking portions 32 of the large diameter portion 30 and the rubber plug locked portions 33 of the sheath fitting portion 18 are locked, whereby the rotation of the rubber plug 15 relative to the cap 17 in a circumferential direction of the rubber plug 15 is suppressed.

As shown in FIGS. 3 and 4, the large diameter portion 30 of the cap 17 presses the sheath fitting portion 18 of the rubber plug 15 radially inwardly of the sheath fitting portion 18 while being externally fitted to the sheath fitting portion 18. In this way, the sheath fitting portion 18 is pressed against the outer periphery of the sheath 14 from outside. This causes the sheath side lips 20 of the sheath fitting portion 18 to be reliably held in close contact with the outer periphery of the sheath 14.

As shown in FIGS. 3 and 4, a small diameter portion 34 (an example of a wire side pressing portion) to be externally fitted to the wire penetrating portion 21 of the rubber plug 15 is formed at a position on a side (right side in FIG. 3) opposite to the large diameter portion 30 in the opening direction of the cap 17 in the cap 17. An outer diameter of the small diameter portion 34 is set to be smaller than that of the large diameter portion 30. As shown in FIG. 12, the small diameter portion 34 is formed to have a trapezoidal cross-sectional shape with rounded corners in conformity with the outer shape of the wire penetrating portion 21.

As shown in FIGS. 3 and 4, the inner periphery of the small diameter portion 34 is held in close contact with a plurality of (three in this embodiment) small-diameterportion side lips 35 formed on the outer periphery of the wire penetrating portion 21. As shown in FIGS. 10 and 11, the small-diameter-portion side lips 35 project outwardly on the outer peripheral surface of the wire penetrating portion 21 and are formed along a circumferential direction of the wire penetrating portion 21. Sealing is provided between the small diameter portion 34 of the cap 17 and the wire penetrating portion 21 of the rubber plug 15 by the close contact of the small-diameter-portion side lips 35 and the inner periphery of the small diameter portion 34 of the cap 17.

As shown in FIGS. 3 and 4, the small diameter portion 34 of the cap 17 presses the wire penetrating portion 21 radially inwardly of the wire penetrating portion 21 of the rubber plug 15 while being externally fitted to the wire penetrating portion 21. In this way, the wire penetrating portion 21 is compressed from outside. This causes the first to fourth wire side lips 26A-26D formed on the inner peripheries of the first to fourth through holes 22A-22D to be reliably held in close contact with the outer peripheries of the respective first to fourth wires 13A, 13B, 13C and 13D.

Figure 13:
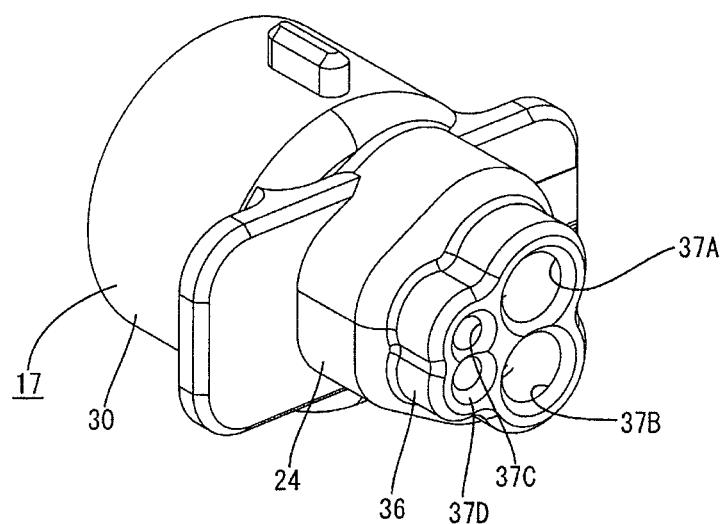
FIG. 13 is a perspective view showing the cap.
Figure 14:
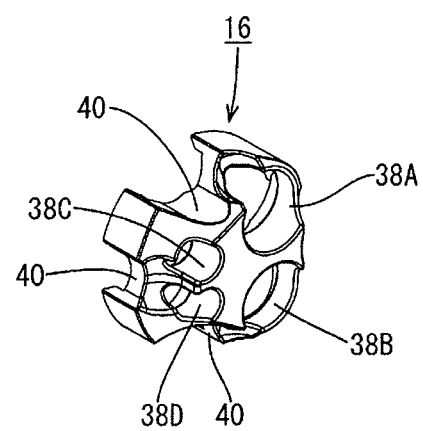
FIG. 14 is a perspective view showing a guide member.
Figure 15:
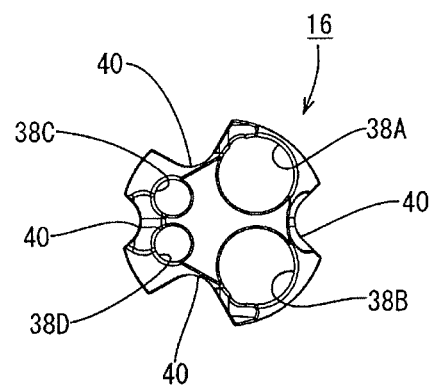
FIG. 15 is a front view showing the guide member.
Figure 16:
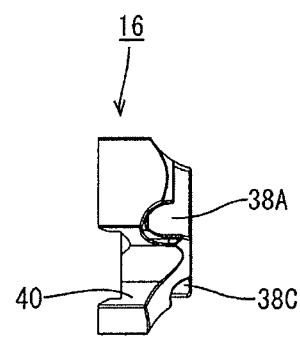
FIG. 16 is a plan view showing the guide member.
Figure 17:
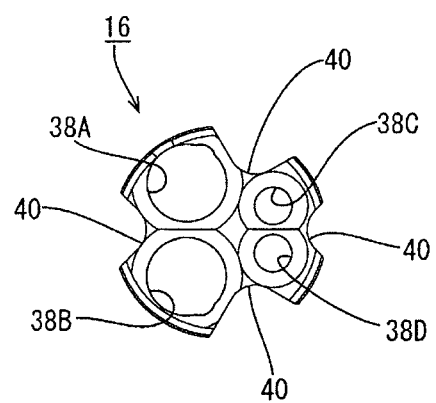
FIG. 17 is a rear view showing the guide member.

As shown in FIGS. 3 and 4, the cap 17 is formed with a back wall 36 at a position on the opposite side in the opening direction of the cap 17. As shown in FIG. 13, a first draw-out hole 37A, a second draw-out hole 37B, a third draw-out hole 37C and a fourth draw-out hole 37D through which the first, second, third and fourth wires 13A, 13B, 13C and 13D are respectively drawn out from the cap 17 are formed to penetrate through the back wall 36.

As shown in FIG. 6, the rubber plug locking portions 32 formed in the large diameter portion 30 of the cap 17 and the rubber plug locked portions 33 formed on the sheath fitting portion 18 of the rubber plug 15 are locked, whereby the rubber plug 15 is relatively positioned with respect to the cap 17. This causes the first to fourth through holes 22A, 22B, 22C and 22D formed in the rubber plug 15 and the first to fourth draw-out holes 37A, 37B, 37C and 37D formed in the cap 17 to respectively match as shown in FIGS. 3 and 4. Specifically, the first through hole 22A and the first draw-out hole 37A match, the second through hole 22B and the second draw-out hole 37B match, the third through hole 22C and the third draw-out hole 37C match and the fourth through hole 22D and the fourth draw-out hole 37D match.

(Guide Member 16)

As shown in FIGS. 14 to 17, a first guide hole 38A through which the first wire 13A is passed, a second guide hole 38B through which the second wire 13B is passed, a third guide hole 38C through which the third wire 13C is passed and a fourth guide hole 38D through which the fourth wire 13D is passed are formed to penetrate through the guide member 16 made of synthetic resin.

As shown in FIGS. 6 and 8, a plurality of (four in this embodiment) guide member locking portions 39 projecting inwardly are formed on the inner periphery of the holding portion 28 of the rubber plug 15.

A plurality of (four in this embodiment) guide member locked portions 40 into which the four guide member locking portions 39 are to be fitted are formed by recessing the outer periphery of the guide member 16. The four guide member locked portions 40 formed on the guide member 16 are respectively formed at positions corresponding to the four guide member locking portions 39 formed in the rubber plug 15.

The four guide member locking portions 39 formed in the holding portion 28 of the rubber plug 15 and the fourth guide member locked portions 40 formed on the guide member 16 are respectively engaged. In this way, the guide member 16 is held with the rotation thereof relative to the rubber plug 15 in a circumferential direction of the guide member 16 suppressed. This causes the rubber plug 15 and the guide member 16 to be relatively positioned. As a result, as shown in FIGS. 3 and 4, the first to fourth through holes 22A, 22B, 22C and 22D of the rubber plug 15 and the first to fourth guide holes 38A, 38B, 38C and 38D of the guide member 16 respectively match. Specifically, the first through hole 22A and the first guide hole 38A match, the second through hole 22B and the second guide hole 38B match, the third through hole 22C and the third guide hole 38C match and the fourth through hole 22D and the fourth guide hole 38D match.

(Manufacturing Process)

Next, an example of a manufacturing process of this embodiment is described. Note that the manufacturing process of this embodiment is not limited to the one described below.

First, the sheath 14 of the multicore cable 11 is removed by a known technique. In this way, the first to fourth wires 13A, 13B, 13C and 13D are drawn out from the end part 14A of the sheath 14.

Figure 18:
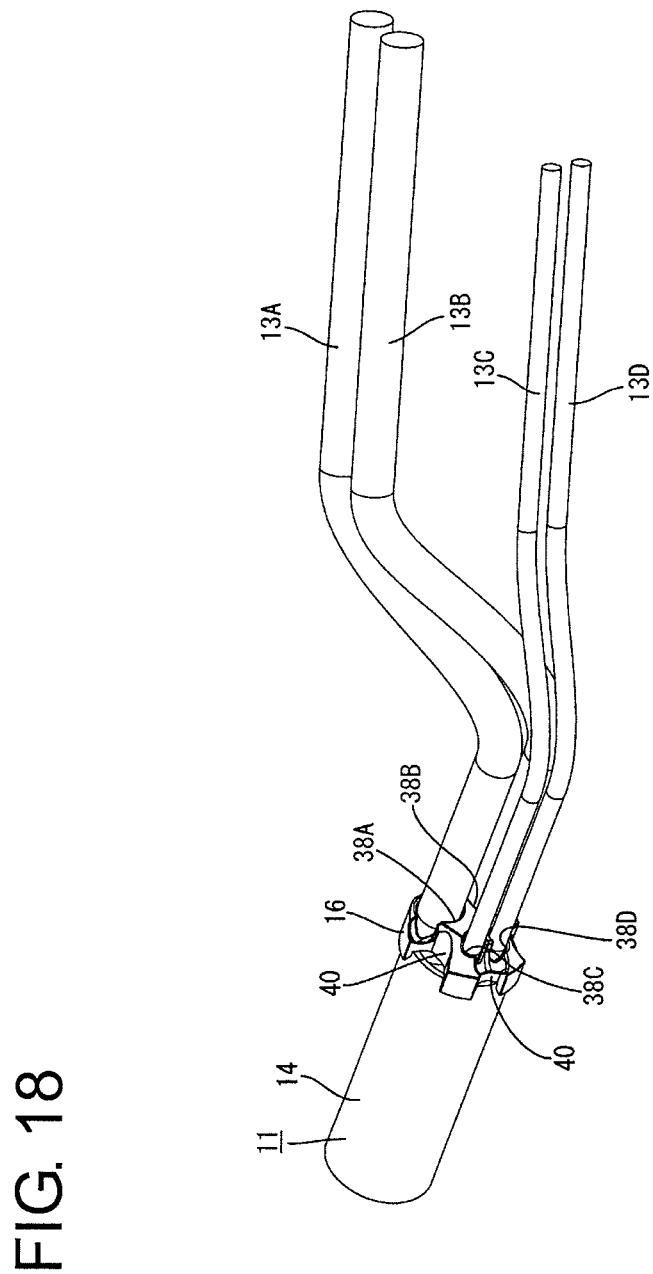
FIG. 18 is a perspective view showing a state where the guide member is mounted on a plurality of wires in a multicore cable having a sheath removed.

Subsequently, as shown in FIG. 18, the first to fourth wires 13A, 13B, 13C and 13D are respectively passed through the first to fourth guide holes 38A, 38B, 38C and 38D of the guide member 16. Specifically, the first wire 13A is passed through the first guide hole 38A, the second wire 13B is passed through the second guide hole 38B, the third wire 13C is passed through the third guide hole 38C and the fourth wire 13D is passed through the fourth guide hole 38D.

Subsequently, the first to fourth wires 13A, 13B, 13C and 13D are respectively passed through the first to fourth through holes 22A, 22B, 22C and 22D of the rubber plug 15. Specifically, the first wire 13A is passed through the first through hole 22A, the second wire 13B is passed through the second through hole 22B, the third wire 13C is passed through the third through hole 22C and the fourth wire 13D is passed through the fourth through hole 22D. Thereafter, the rubber plug 15 is moved to the position of the guide member 16.

Figure 19:
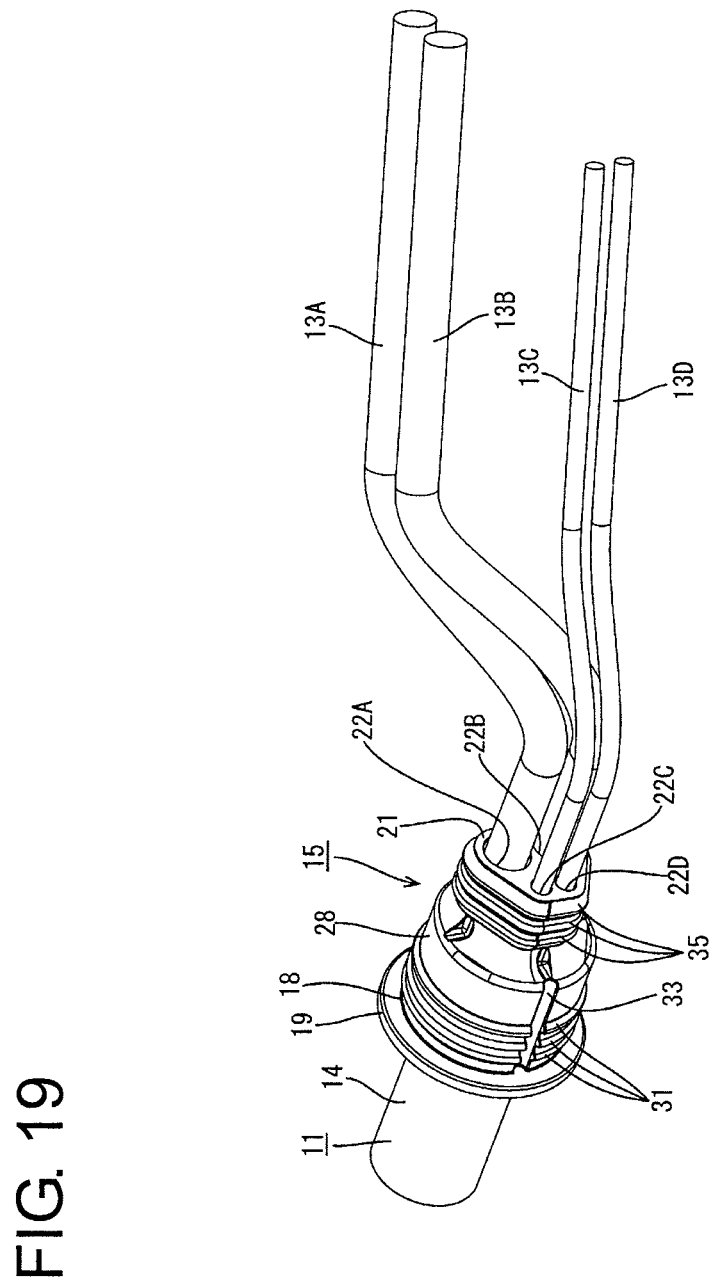
FIG. 19 is a perspective view showing a state where the rubber plug is externally fitted to an end part of the sheath of the multicore cable.

Subsequently, relative positions of the rubber plug 15 and the guide member 16 are adjusted such that the first to fourth through holes 22A, 22B, 22C and 22D of the rubber plug 15 and the first to fourth guide holes 38A, 38B, 38C and 38D of the guide member 16 are respectively arranged to match. In the above state, the guide member locking portions of the rubber plug 15 and the guide member locked portions of the guide member 16 are locked. In this way, the guide member 16 is held in the holding portion 28 of the rubber plug 15 with the first to fourth through holes 22A, 22B, 22C and 22D of the rubber plug 15 and the first to fourth guide holes 38A, 38B, 38C and 38D of the guide member 16 respectively matching. Thereafter, as shown in FIG. 19, the rubber plug 15 is moved to the end part 14A of the sheath 14 and the sheath fitting portion 18 of the rubber plug 15 is externally fitted to the end part 14A of the sheath 14.

Subsequently, the first to fourth wires 13A, 13B, 13C and 13D are respectively passed through the first to fourth draw-out holes 37A, 37B, 37C and 37D of the cap 17. Specifically, the first wire 13A is passed through the first draw-out hole 37A, the second wire 13B is passed through the second draw-out hole 37B, the third wire 13C is passed through the third draw-out hole 37C and the fourth wire 13D is passed through the fourth draw-out hole 37D. Thereafter, the cap 17 is moved to the position of the rubber plug 15 externally fitted to the end part 14A of the sheath 14.

Subsequently, relative positions of the rubber plug 15 and the cap 17 are adjusted such that the first to fourth through holes 22A, 22B, 22C and 22D of the rubber plug 15 and the first to fourth draw-out holes 37A, 37B, 37C and 37D of the cap 17 are respectively arranged to match. In the above state, the rubber plug locking portions of the cap 17 and the rubber plug locked portions of the rubber plug 15 are locked. In this way, the cap 17 is externally fitted to the rubber plug 15 with the first to fourth through holes 22A, 22B, 22C and 22D of the rubber plug 15 and the first to fourth draw-out holes 37A, 37B, 37C and 37D of the cap 17 respectively matching. Thereafter, the cap 17 is pushed until coming into contact with the flange portion 19 of the rubber plug 15. In this way, the seal member 10 according to this embodiment is completed and the seal structure 12 for the multicore cable 11 is completed (see FIG. 1).

(Functions and Effects of Embodiment)

Next, functions and effects of this embodiment are described. According to this embodiment, sealing is provided between the sheath 14 and the rubber plug 15 by the sheath side lips 20 provided in the rubber plug 15. Further, sealing is provided between each of the first to fourth wires 13A, 13B, 13C and 13D and the rubber plug 15 by the first to fourth wire side lips 26A, 26B, 26C and 26D respectively formed in the first to fourth through holes 22A, 22B, 22C and 22D through which the first to fourth wires 13A, 13B, 13C and 13D are respectively passed. As just described, according to this embodiment, it is possible to seal between the sheath 14 and the rubber plug 15 and between each of the plurality of first to fourth wires 13, 13B, 13C and 13D branched from the multicore cable 11 by mounting the rubber plug 15 on the end part 14A of the sheath 14 of the multicore cable 11. As a result, operation efficiency for suppressing the intrusion of liquid into the interior of the sheath 14 from the end part 14A of the sheath 14 and from the branched parts of the plurality of first to fourth wires 13A, 13B, 13C and 13D can be improved in the multicore cable 11.

Further, according to this embodiment, the cap 17 is externally fitted to the rubber plug 15 and includes the large diameter portion 30 for bringing the outer periphery of the sheath 14 and the sheath side lips 20 into close contact for sealing by pressing the sheath fitting portion 18 of the rubber plug 15 from outside and the small diameter portion 34 for bringing the outer peripheries of the plurality of first to fourth wires 13A, 13B, 13C and 13D and the first to fourth wire side lips 26A, 26B, 26C and 26D respectively formed in the plurality of first to fourth through holes 22A, 22B, 22C and 22D into close contact for sealing by pressing the wire penetrating portion 21 from outside. In this way, sealing is reliably provided between the sheath 14 and the rubber plug 15 and between each of the first to fourth wires 13A, 13B, 13C and 13D and each of the first to fourth through holes 22A, 22B, 22C and 22D. As a result, the intrusion of liquid into the interior of the sheath 14 from the end part 14A of the sheath 14 and from the branched parts of the plurality of first to fourth wires 13A, 13B, 13C and 13D can be reliably suppressed.

Further, according to this embodiment, the rubber plug 15 is formed with the holding portion 28 for holding the guide member 16 including the plurality of first to fourth guide holes 38A, 38B, 38C and 38D, through which the plurality of first to fourth wires 13A, 13B, 13C and 13D drawn out from the end part 14A of the sheath 14 are respectively passed, at the position between the sheath fitting portion 18 and the wire penetrating portion 21, and the plurality of first to fourth guide holes 38A, 38B, 38C and 38D and the plurality of first to fourth through holes 22A, 22B, 22C and 22D respectively correspond with the guide member 16 held in the holding portion 28. In this way, the plurality of first to fourth wires 13A, 13B, 13C and 13D can be respectively reliably passed through the plurality of first to fourth through holes 22A, 22B, 22C and 22D provided in the rubber plug 15. This enables the outer peripheries of the respective first to fourth wires 13A, 13B, 13C and 13D and the first to fourth wire side lips 26A, 26B, 26C and 26D respectively formed in the first to fourth through holes 22A, 22B, 22C and 22D to be reliably held in close contact. As a result, the intrusion of liquid into the interior of the sheath 14 from the branched parts of the plurality of first to fourth wires 13A, 13B, 13C and 13D can be reliably suppressed.

Further, according to this embodiment, the plurality of first to fourth wires 13A, 13B, 13C and 13D include two or more types of first to fourth wires 13A, 13B, 13C and 13D having different outer diameters, and the plurality of first to fourth through holes 22A, 22B, 22C and 22D of the rubber plug 15 have inner diameters respectively corresponding to the outer diameters of the plurality of first to fourth wires 13A, 13B, 13C and 13D. In this way, sealing can be reliably provided between each of the plurality of first to fourth wires 13A, 13B, 13C and 13D even if the outer diameters of the plurality of first to fourth wires 13A, 13B, 13C and 13D are different.

Other Embodiments

The present invention is not limited to the above described and illustrated embodiment. For example, the following embodiments are also included in the technical scope of the present invention.

Two, three, five or more wires may be arranged in the multicore cable.

The plurality of wires include the wires having two different outer diameters, but may include wires having three or more different outer diameters without being limited to this.

The plurality of wires may have the same outer diameter.

The guide member 16 can be omitted.

The cap 17 can be omitted.

The wire may be a shield wire. Further, the wire may be a twisted wire including a core formed by twisting a plurality of metal thin wires or may be a single-core wire having a metal bar member as a core. As just described, an arbitrary wire can be appropriately selected as the wire according to need.

The multicore cable 11 may be a so-called cab-tire cable or may be a multicore shield wire in which the outer peripheries of a plurality of wires are surrounded by a shield layer. As just described, an arbitrary multicore cable can be appropriately selected as the multicore cable 11 according to need.

According to the seal member 10 or the seal structure 12 of this embodiment, arbitrary liquid such as water, oil or organic solvent can be sealed according to need.

In this embodiment, the seal member 10 is assembled and the seal structure 12 for the multicore cable 11 is formed by mounting the guide member 16, the rubber plug 15 and the cap 17 in this order on the multicore cable 11 having the sheath 14 removed. However, without limitation to this, the multicore cable 11 and the seal member 10 may be assembled by inserting the plurality of wires of the multicore cable 11 having the sheath 14 removed through the seal member 10 assembled in advance.

LIST OF REFERENCE SIGNS

10: seal member
11: multicore cable
12: seal structure
13A: first wire
13B: second wire
13C: third wire
13D: fourth wire
14: sheath
15: rubber plug
16: guide member
17: cap
18: sheath fitting portion
20: sheath side lip
21: wire penetrating portion
22A: first through hole
22B: second through hole
22C: third through hole
22D: fourth through hole
26A: first wire side lip
26B: second wire side lip
26C: third wire side lip
26D: fourth wire side lip
28: holding portion
30: large diameter portion
34: small diameter portion
38A: first guide hole
38B: second guide hole
38C: third guide hole
38D: fourth guide hole

The invention claimed is:

1. A seal structure for multicore cable, comprising:
a multicore cable configured such that a plurality of wires are surrounded by a sheath and drawn out from an end part of the sheath; and
a rubber plug including a sheath fitting portion configured to be externally fitted to the end part of the sheath and a wire penetrating portion having a plurality of through holes, through which the plurality of wires drawn out from the end part of the sheath are respectively passed;
wherein:
a sheath side lip configured to be held in contact with an outer periphery of the sheath is provided on an inner periphery of the sheath fitting portion; and
a wire side lip configured to be held in close contact with an outer periphery of each of the plurality of wires is provided on an inner periphery of each of the plurality of through holes, and
wherein an outermost diameter of the sheath fitting portion is larger than an outermost diameter of the wire penetrating portion.

2. A seal structure for multicore cable according to claim 1, wherein:
a cap is externally fitted to the rubber plug; and
the cap includes:
a sheath side pressing portion configured to bring the outer periphery of the sheath and the sheath side lip into close contact for sealing by pressing the sheath fitting portion of the rubber plug from outside; and
a wire side pressing portion configured to bring the outer periphery of each of the plurality of wires and the wire side lip in each of the plurality of through holes into close contact for sealing by pressing the wire penetrating portion from outside.

3. A seal structure for multicore cable according to claim 1, wherein:
the rubber plug is formed with a holding portion configured to hold a guide member including a plurality of guide holes, through which the plurality of wires drawn out from the end part of the sheath are respectively passed, at a position between the sheath fitting portion and the wire penetrating portion; and
each of the plurality of guide holes and each of the plurality of through holes correspond when the guide member is held in the holding portion.

4. A seal structure for multicore cable according to claim 1, wherein:
the plurality of wires include two or more types of wires having different outer diameters; and
the plurality of through holes of the rubber plug have inner diameters corresponding to the outer diameters of the plurality of wires.

5. A seal member to be mounted on a multicore cable configured such that a plurality of wires are surrounded by a sheath and drawn out from an end part of the sheath, comprising:
a rubber plug including a sheath fitting portion configured to be externally fitted to the end part of the sheath and a wire penetrating portion having a plurality of through holes, through which the plurality of wires drawn out from the end part of the sheath are respectively passed;
wherein:
a sheath side lip configured to be held in contact with an outer periphery of the sheath is provided on an inner periphery of the sheath fitting portion; and
a wire side lip configured to be held in close contact with an outer periphery of each of the plurality of wires is provided on an inner periphery of each of the plurality of through holes, and
wherein an outermost diameter of the sheath fitting portion is larger than an outermost diameter of the wire penetrating portion.

6. A seal member according to claim 5, wherein:
a cap is externally fitted to the rubber plug; and
the cap includes:
a sheath side pressing portion configured to bring the outer periphery of the sheath and the sheath side lip into close contact for sealing by pressing the sheath fitting portion of the rubber plug from outside; and
a wire side pressing portion configured to bring the outer periphery of each of the plurality of wires and the wire side lip in each of the plurality of through holes into close contact for sealing by pressing the wire penetrating portion from outside.

7. A seal member according to claim 5, wherein:
the rubber plug is formed with a holding portion configured to hold a guide member including a plurality of guide holes, through which the plurality of wires drawn out from the end part of the sheath are respectively passed, at a position between the sheath fitting portion and the wire penetrating portion; and
each of the plurality of guide holes and each of the plurality of through holes correspond when the guide member is held in the holding portion.

8. A seal member according to claim 5, wherein:
the plurality of wires include two or more types of wires having different outer diameters; and
the plurality of through holes of the rubber plug have inner diameters corresponding to the outer diameters of the plurality of wires.

* * * * *